Figure 1:
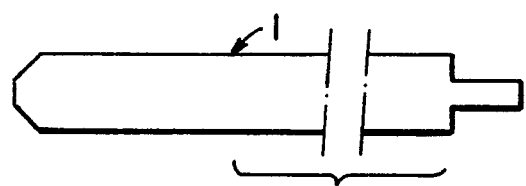

United States Patent

Jonnard

Patent Number: 5,156,565
Date of Patent: Oct. 20, 1992

[54] PROCESS TO PREPARE NATURAL CASINGS IN THE PORK BUTCHER'S TRADE AND THE DEVICE TO IMPLEMENT IT

[76] Inventor: Pierre Jonnard, 14 Rue Giffard Résidence du Parc Immeuble "Champagne II", 38230 Pont de Cheruy, France

[21] Appl. No.: 623,705
[22] PCT Filed: Apr. 30, 1990
[86] PCT No.: PCT/FR90/00309
§ 371 Date: Dec. 14, 1990
§ 102(e) Date: Dec. 14, 1990
[87] PCT Pub. No.: WO90/13226
PCT Pub. Date: Nov. 15, 1990

[30] Foreign Application Priority Data

May 3, 1989 [FR] France ............... 89 06390

[51] Int. Cl.$^5$ ............................................. A22C 13/00
[52] U.S. Cl. ........................................ 452/32; 452/33; 138/118.1
[58] Field of Search ............... 452/30, 32, 33, 35; 138/118.1

[56] References Cited

U.S. PATENT DOCUMENTS

| | | | |
|---|---|---|---|
| 3,826,852 | 7/1974 | Lenaco et al. | 452/21 |
| 4,347,847 | 9/1982 | Usher | 128/334 R |
| 4,363,819 | 12/1982 | Steffen | 426/132 |
| 4,397,337 | 8/1983 | Porrmann et al. | 138/118.1 |
| 4,571,922 | 2/1986 | Steffen | 53/397 |
| 4,690,173 | 9/1987 | Urbutis | 452/21 |
| 4,769,038 | 9/1988 | Bendavid | 623/13 |

FOREIGN PATENT DOCUMENTS

| | | |
|---|---|---|
| 0169045 | 1/1986 | European Pat. Off. |
| 0239775 | 10/1987 | European Pat. Off. |
| 1504982 | 8/1970 | Fed. Rep. of Germany |
| 3008270 | 9/1981 | Fed. Rep. of Germany |

Primary Examiner—Willis Little
Attorney, Agent, or Firm—Parkhurst, Wendel & Rossi

[57] ABSTRACT

A process is disclosed for facilitating production of natural casings used for making pork sausage and the like where a sheath is used in association with the casings. A flat sheet with longitudinal edges, shapes, and shapes permitting the sheet to be rolled into a sheath is rolled into a sheath having a tubular shape and at least slight overlap of the longitudinal edges of the flat sheet. The casing is placed on the sheath, which permits the sheath to be put over the nozzle of a filling pusher for sausage preparation. The process allows casings to be reconstructed by wetting when applied to the nozzle. Casings do not have to be kept in salt brine. A related device is disclosed also.

11 Claims, 3 Drawing Sheets

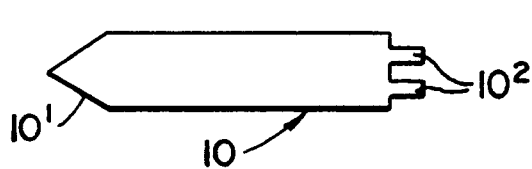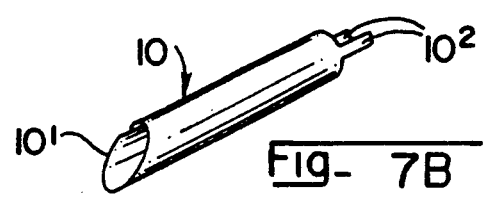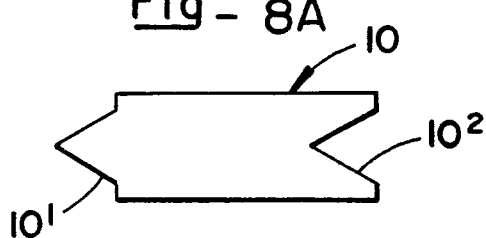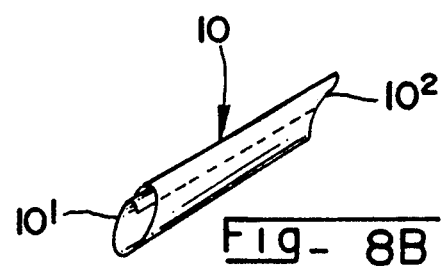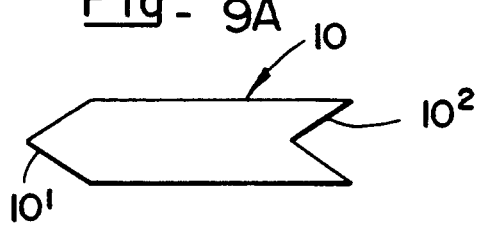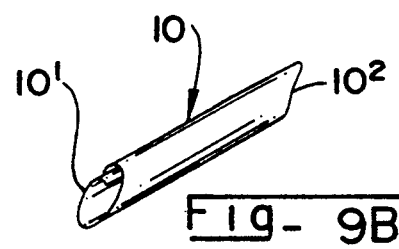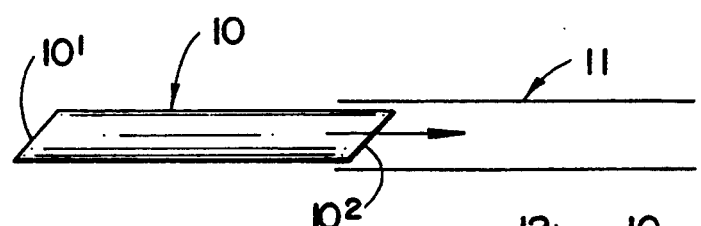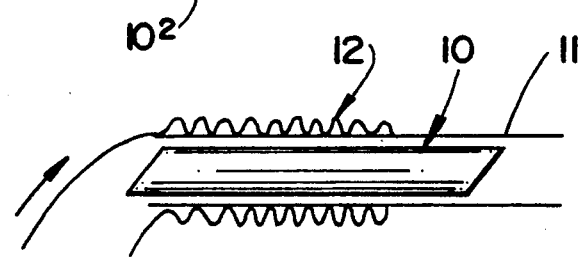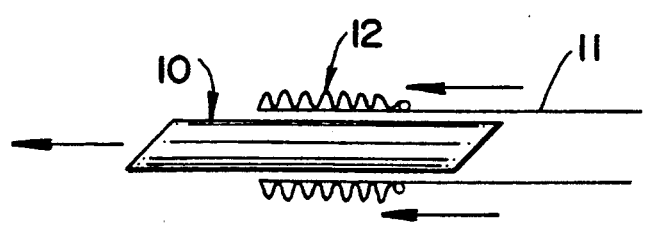

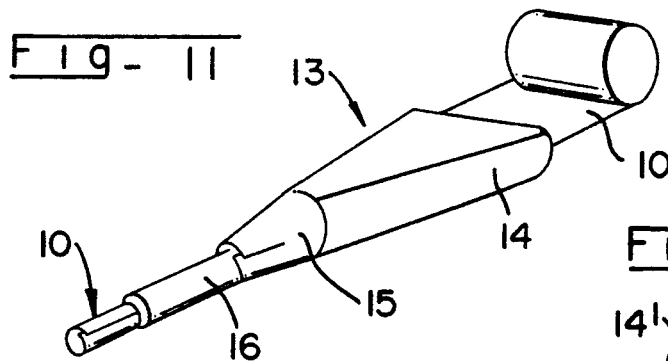
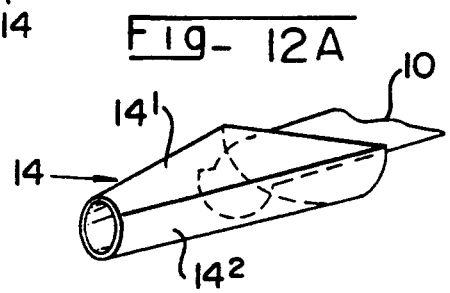
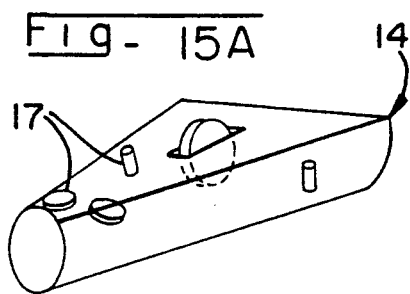
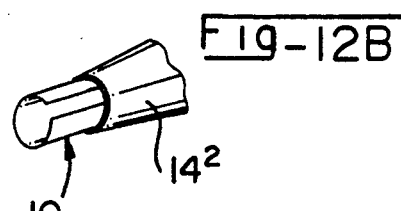
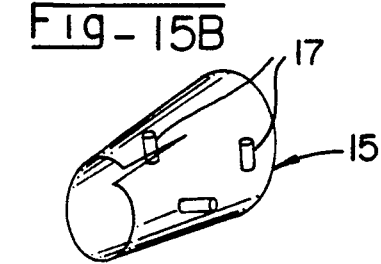
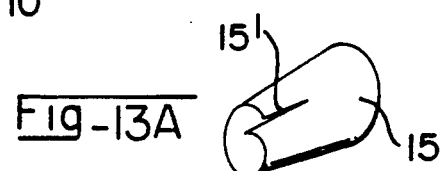
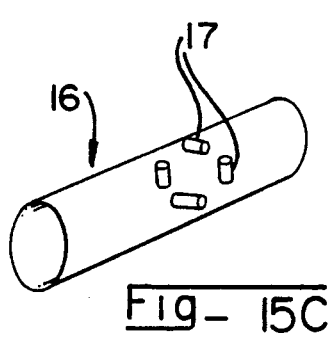
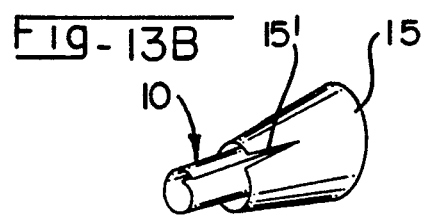
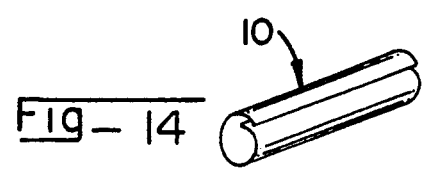

PROCESS TO PREPARE NATURAL CASINGS IN THE PORK BUTCHER'S TRADE AND THE DEVICE TO IMPLEMENT IT

The invention relates to the technical sector of casing. In order to understand the aim of the invention, it is necessary to recapitulate the development of the casing preparation technique on the nozzle before the hose filling operation by referring to FIGS. 1 to 6.

Initially, the casing was presented in salted masses, then brine thus enabling a saving in time and better sliding in order to slip the casing over the nozzle. The casing was generally presented folded in concertina form lengthwise, thereby using, in particular, a tube acting as an internal support.

According to this implementation the casing can be transferred from the tube to the nozzle directly. It is also possible, in order to obtain large lengths of casings, to insert a plurality of sections of casings folded and partially overlapping.

Figure 2:
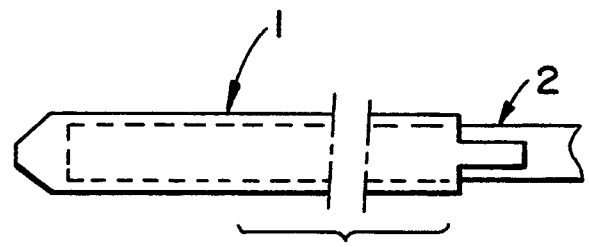
Figure 3:
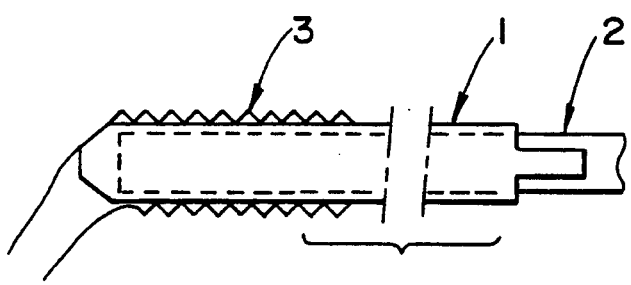
Figure 4:
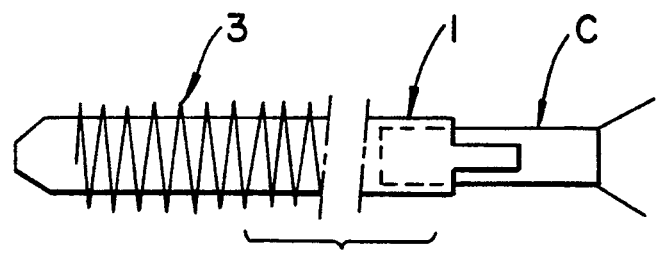

According to a non-limitative example illustrated in FIG. 1, the tube is made in the form of a flexible sheath (1) generally made of plastic, closed at one end. Therefore, in order to mount the casing, a rigid support (2) is used, around which the sheath (1) is engaged (FIG. 2). Then the casing (3) is mounted on the sheath (1) by introducing the water or brine in order to facilitate the sliding (FIG. 3). In order to position the casing on the nozzle (C), the sheath is then slipped over it (FIG. 4), then the sheath is removed thereby retaining the casing which is placed on the nozzle, thanks to an operation to hold the casing.

Then the filling and forming of sausages and saucissons or similar products, is carried out.

In practice, these operations are long and tedious. Besides, a certain fragility of the sheath when it is mounted on the nozzle is found.

In order to try and overcome these disadvantages, according to the prior art, it was proposed to insert a rigid tongue associated to the sheath in order to facilitate the mounting. The tongue is removed from the rear and the sheath from the front during use. However, this operation is somewhat impractical.

Figure 5:
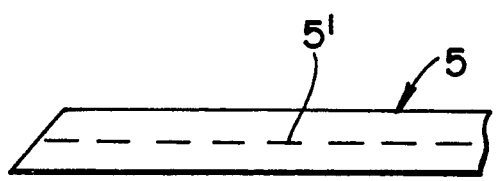
Figure 6:
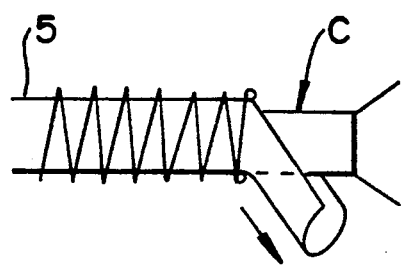

It was also proposed, in Patent FR 2.462.871 to provide the sheath (5), particularly with a longitudinal pre-cut (5.1) and place the assembly of different sections of casings on the nozzle then remove the sheath (FIG. 5). Therefore, during mounting on the nozzle, you just have to extend the movement to the rear by holding the casing with two fingers in order to tear and discharge the sheath (FIG. 6). This process avoids having to change the folding directions, enables mounting in one single action and in the case of overlapping sections of casings, prevents them from being undone, since the tensile strength applied to remove the sheath, compresses the concertina type folds in the mounting direction. However, this technique does have certain disadvantages. Firstly, the sheath diameter must be close to the size of the casing. Furthermore, as the casing is practically sealed, with the exception of the pre-cut line which defines microperforations, it is difficult to soak the casing before use. Therefore, all the current casing preparation techniques with a view to filling, do have certain disadvantages.

Another disadvantage related to all the prior techniques, lies in the fact that it is necessary to add a sheath every time the quantity of casings placed on the sheath and nozzle has been used up. In practice, and according to the techniques used, there may be a need to add a sheath every 18 to 20 metres of casing, which calls for numerous handling operations.

The aim sought after by the invention was therefore, to offer a new, simple method, easy to implement and capable of possibly entering within the framework of automated production.

According to a first characteristic, the process according to the invention is characterised wherein it enables the use of a support means acting as a sheath, previously in the form of a flat sheet, cut to shapes and sizes to be obtained, the said support means forming a sheath being put into a tubular shape by one or several deformations and successive rolling up operations with slight overlapping of its longitudinal edges, the sheath therefore obtained, taking the casing then being placed on the nozzle.

According to another characteristic, the process is characterised wherein the sheath is rolled into a roll in an automated process and the end is unrolled then inserted into a shaping device enabling the sheath to be put in the form of a roll with longitudinal edges partially overlapping, when it comes out.

According to another characteristic, the process is characterised wherein the continuous shaping of the sheath and positioning of the casing are combined. According to another characteristic, the implementation device of the process is characterised wherein it comprises a first component forming a funnel with one flat side with a width equal to the width of the hose and one cylindrical side, the circumference of which is substantially greater than the diameter of the rolled up sheath, the said component with a decreasing cross section, being connected to a second truncated cone shaped component, and wherein the said second component has an internal deformation enabling the preformed sheath to be guided and its longitudinal ends to overlap partially, and wherein the sheath being either precut initially or cut by a means arranged at the outlet of the said device.

These characteristics and others shall be made well apparent from the following description.

In order to clarify the object of the invention, however without limiting it, the invention is illustrated by the accompanying drawings where:

FIGS. 1 to 6 are schematic views illustrating the different techniques according to the prior art, FIGS. 7A, 7B, 8A, 8B, 9A, 9B are schematic views illustrating the shaping of the sheath according to the invention, into the form of a support sheet, from an initial flat position to a final rolled up position, FIGS. 10A, 10B, 10C show the manual mounting of the support sheet according to the invention with a view to placing the casing on the nozzle, FIG. 11 is a view showing the support sheet shaping device according to the invention, FIGS. 12A, 12B show the shaping of the support sheet in the first means of the device, FIG. 12A showing the beginning of preforming of the sheet in the device and FIG. 12B, the outlet of the support sheet, FIGS. 13A, 13B show the shaping of the support sheet in the second means of the device, FIG. 14 shows the shaping of the support sheet in the third means of the device, FIGS. 15A, 15B, 15C are views of alternatives of the first means of the sheet shaping device according to the invention.

The object of the invention will become more apparent from the following non-limiting description, when considered in conjunction with the accompanying drawings.

The process for the preparation and positioning of casings on the nozzle (C) of a filling pusher, aims to use a support means acting as a sheath previously put into the form of a flat sheet which is cut to the shapes and sizes to be obtained, then put into a tubular shape by one or several deformations and successive rolling up operations with slight overlapping of its longitudinal edges, the said sheath thus obtained, receiving the casing then being placed over the nozzle.

The sheath (10) is therefore pre-rolled into a roll with predetermined and precut shapes, or the sheath can be in the form of different flat sheets after cutting. FIGS. 7A, 7B, 8A, 8B, 9A, 9B, illustrate different configurations of the sheath in a flat position then rolled up. Therefore, the front of the said sheath has a pointed or bevelled shape (10.1) in order to facilitate the insertion of the casing and the rear part (10.2), has a cut part in the form of tongues (10.2) in order to facilitate its engagement over the nozzle. The rear part can be defined by two opposing lugs or shaped when the sheet is rolled up in order to have only one part of the end appear. It is necessary to note that in an advantageous manner, the pointed (10.1) shape is in a different plane to the preformed tongues, thereby giving the folding and engaging direction on the nozzle. Within the framework of a sheath in the form of a roll, the precut shapes at the front and rear of each section of sheath, are advantageously complementary.

The sheath implemented according to the invention, has several advantages. Its production cost is reduced and it can be adapted to casings of all diameters. Besides, when there is no sealing between the overlapping parts, the assembly can still be soaked before being slipped over the nozzle.

The sheath in the form of a flat support sheet, can be manually rolled up piece by piece, or mechanically within the framework of an automated system.

In the first implementation and referring to FIGS. 10A, 10B, 10C, the sheath (10) is rolled up manually and inserted into a tube (11), the ends of the sheath overlapping. Then the casing (12), is mounted on the concertina folded tube. Then the tube is removed so that the casing comes over the sheath. This is then slipped over the nozzle (C). After positioning, the sheath is removed from the nozzle, in a similar way to the prior art and the meat filling operation can be carried out. In another implementation likely to enter into an automated process, the sheath is rolled into a roll and the end of sheath unrolled is inserted into a shaping device (13), enabling, at the outlet of this device, the sheath to be in roll form with the longitudinal edges overlapping partially. In order to carry out the separation of the different sections of sheath, it can be considered that a precut has been made on the rolled up sheath when it is produced, and in this case, predetermined lengths of sheaths in the desired shapes and sizes, are obtained. As an alternative model, at the outlet of the rolling up device, cutting means of the scissor type or others are provided, for simple shapes of the ends of the sheath, these cuts are made in an advantageous manner, obliquely in order to enable the introduction and removal of the sheath from the nozzle.

According to non-limitative implementation, the shaping device (13) comprises a first component (14), hollow inside and with one flat side (14.1) with a width equal to the width of the hose and one cylindrical side (14.2) so that the circumference is substantially greater than the diameter of the rolled up sheath. This first component forms a funnel with a decreasing section, so that the sheath is progressively shaped without, however, its ends overlapping, the sheath is tubular shaped. The first component (14) is connected or linked, by any suitable connecting means, to a second component (15) profiled in a truncated cone shape. This second component has an internal deformation (15.1) enabling the preformed sheath to be guided and its longitudinal ends to be partially overlapped. At the outlet of the second component, the sheath is finally shaped. In a complementary, however non-compulsory manner, the sheath thus passes into a cylindrical tube (16) in order to complete its shaping and to have a regular finish. As an alternative model, the device (13), can be solid. It is also designed to take a fluid supply pipe (not illustrated), providing a flow the nozzle in order to facilitate the introduction of the sheath over the nozzle.

In a particularly advantageous implementation, the tube (16) is the one on which the casing is mounted and thus continuous operation is achieved.

It is also possible to combine the continuous shaping of the sheath and positioning of the casing on the support thereby suppressing all the operations prior to adding the piece of sheath onto the nozzle.

In the case of complete automation, it can be envisaged to provide the first component with means facilitating the feed of the sheath. These means can be made as illustrated in FIGS. 15A, 15B, 15C in the form of small rolls or balls (17) either regularly distributed or not along the periphery of the said component (14).

The advantages are made well apparent from the invention. The simplicity of the process and its perfect adaptability to any sized diameter of casing, are to be highlighted. Besides, the product obtained has a very low cost price considering its production requirements. It is also possible to adapt the length of the casings to the size of the nozzle.

I claim:

1. In a process for the preparation of natural casings wherein a sheath is used in association therewith, a succession of sections of natural casings with overlapping ends are mounted and folded on the sheath, which during the preparation of sausage is slipped over the nozzle of a filling pusher, the invention which comprises:

providing a flat sheet having longitudinal edges and shapes and dimensions permitting the flat sheet to be rolled into a sheath, forming said flat sheet into a sheath having a tubular shape and at least slight overlap of the longitudinal edges of the flat sheet, and placing the casing on the sheath, which allows the sheath initially to be placed on the nozzle and subsequently removed prior to the filling operation during sausage manufacture.

2. The process of claim 1 wherein said sheath has a pointed or bevelled front and a rear portion having a cut in the form of a tongue.

3. The process of claim 1 wherein the provided flat sheet has predetermined and precut shapes and said flat sheet is on a roll.

4. The process of claim 1 comprising cutting the sheath in the form of different flat sheets.

5. The process of claim 1 wherein said sheath is rolled up manually and has overlapping ends, inserting said sheath into a tube, mounting a casing on the tube, removing the tube to permit the casing to come into contact with the sheath, slipping the tube and sheath over a nozzle, and removing the sheath from the nozzle causing the casing to come into contact with the nozzle for the filling operation.

6. The process of claim 1 being carried out in an automated fashion comprising rolling the sheath up into a roll, unrolling an end of the roll and inserting the end into a shaping device to permit initially the sheath to be in the form of a roll with longitudinal edges of the sheath partially overlapping.

7. The process of claim 6, comprising rolling the sheath up into a roll, inserting same into a funnel-shaped die to provide a first shaping of the sheath without overlapping of the longitudinal ends, inserting the initially-shaped sheath into a second truncated cone component to cause the sheath to have overlapped longitudinal edges, and introducing the resulting sheath into a third and final shaping tube.

8. The process of claim 7 further comprising cutting the finally-shaped sheath.

9. The process of claim 7 wherein said third and final shaping tube constitutes a casing support and the sheath shaping step and the step of placing the casing on the shaping tube are carried out continuously.

10. A device for the preparation of natural casings having a rolled-up supporting sheath formed from a flat sheet comprising
   a first component formed of a funnel having one flat side that is the same width as the flat sheet and one cylindrical side, whose circumference is substantially greater than the diameter of the rolled-up sheath, said first component having a decreasing cross section, and
   a second truncated cone-shaped component, connected to said first component, having a guide means for the rolled-up sheath and means to cause the ends of the rolled-up sheath to be partially overlapped.

11. The device of claim 10 further comprising cutting means for the rolled-up sheath.

* * * * *